US008635837B2

(12) United States Patent
Ward et al.

(10) Patent No.: US 8,635,837 B2
(45) Date of Patent: Jan. 28, 2014

(54) REDUCED FOOTPRINT SUBSTRATE INTERLEAVER FOR FOOD PREPARATION LINE

(75) Inventors: Lawrence Ward, Schwenksville, PA (US); Dante Pietrinferni, Douglassville, PA (US); Allen Ely, Downingtown, PA (US)

(73) Assignee: Packaging Progressions, Inc., Collegeville, PA (US)

( * ) Notice: Subject to any disclaimer, the term of this patent is extended or adjusted under 35 U.S.C. 154(b) by 417 days.

(21) Appl. No.: 12/995,780

(22) PCT Filed: Jun. 5, 2009

(86) PCT No.: PCT/US2009/046362
§ 371 (c)(1),
(2), (4) Date: Dec. 2, 2010

(87) PCT Pub. No.: WO2009/149322
PCT Pub. Date: Dec. 10, 2009

(65) Prior Publication Data
US 2011/0081225 A1 Apr. 7, 2011

Related U.S. Application Data

(60) Provisional application No. 61/058,942, filed on Jun. 5, 2008.

(51) Int. Cl.
B65B 25/08 (2006.01)
(52) U.S. Cl.
USPC .......... 53/157; 53/389.3; 426/420; 414/789.5

(58) Field of Classification Search
USPC ............. 206/516, 821; 270/58.02; 414/789.5, 414/927, 929; 426/420; 53/157
See application file for complete search history.

(56) References Cited

U.S. PATENT DOCUMENTS

| 1,763,308 | A | | 6/1930 | Horn |
| 2,969,099 | A | * | 1/1961 | Gillman ...................... 177/120 |
| 3,250,054 | A | * | 5/1966 | Hurlbut et al. .................. 53/66 |
| 3,256,557 | A | * | 6/1966 | Blake ............................ 425/556 |
| 3,552,735 | A | | 1/1971 | Felstehausen |
| 3,846,958 | A | * | 11/1974 | Divan ............................. 53/502 |
| 4,041,676 | A | | 8/1977 | Smithers |
| 4,074,509 | A | * | 2/1978 | Miles ............................. 53/122 |
| 4,236,855 | A | * | 12/1980 | Wagner et al. ............. 414/789.5 |
| 4,532,751 | A | * | 8/1985 | Mally et al. .................... 53/396 |
| 5,868,547 | A | | 2/1999 | Cohn |
| 6,263,640 | B1 | * | 7/2001 | Handel .......................... 53/156 |
| 6,899,512 | B2 | | 5/2005 | Roth |
| 6,994,206 | B2 | * | 2/2006 | Adamski et al. ............. 198/733 |
| 2002/0089110 | A1 | | 7/2002 | Ely |

* cited by examiner

Primary Examiner — Gregory Adams
(74) Attorney, Agent, or Firm — Volpe and Koenig, P.C.

(57) ABSTRACT

A food processing system having a slicer/former for food preparations having a feed conveyor, a stacker for stacking food preparations, and n interleaver for inserting a substrate under a food preparation from the food slicer/former as it transitions to the stacker. The interleaver is arranged such that a portion of the interleaver is located beneath the feed conveyor of the slicer/former. The interleaver includes an interleaver conveyor which extends from the feed conveyor to the stacker in-feed conveyor, and an overall length of the interleaver conveyor is less than a length of the interleaver in order to provide a reduced footprint interleaver for new and retro-fit applications having a limited length for the food processing system.

10 Claims, 7 Drawing Sheets

US 8,635,837 B2

REDUCED FOOTPRINT SUBSTRATE INTERLEAVER FOR FOOD PREPARATION LINE

CROSS REFERENCE TO RELATED APPLICATIONS

This application is a 371 National Phase of PCT/US2009/046362, filed Jun. 5, 2009, which claims the benefit of U.S. Provisional Application No. 61/058,942, filed Jun. 5, 2008.

BACKGROUND

Present invention relates to interleaving devices used in connection with food preparations. More specifically, the invention is directed to an interleaver for interleaving a substrate beneath food preparations, with the interleaver having a reduced footprint so that the size of a food production line is only minimally affected.

Food setups, meat patties and other food items are interleaved with substrates so that the setup, patty or other item can be stacked one on top of another for packaging in trays without the risk of the food items becoming intermixed or stuck together. Food setups may include sliced meats and cheeses, such as those used in sandwiches so that a food preparer can simply remove a setup and place it in a sandwich. Meat patties are typically hamburger, turkey burger or other types of patties which are formed and then stacked one upon the other prior to being placed in a tray and wrapped.

In many food production lines, the typical insertion interleaver or paper placer for placing a substrate between the food setup, meat patty or other item occupies a space along the production line that is anywhere from 5 to 6 feet in length, therefore taking a substantial space in the production line for such items. In production lines which are being converted over to provide an interleaved substrate, there is often insufficient room in the production line to provide this amount of space for a substrate interleaver without substantial reconfiguration and/or rework of the factory floor being required. Additionally, with the high cost associated with manufacturing floor space as a fixed overhead item, it is desirable to reduce costs in new installations. Thus, there is the need for the cost effective interleaver which can be used in connection with food production lines and which has a reduced footprint so that it can be retro-fitted into existing lines without requiring a major reconfiguration of the production lines, and which can be used to save floor space in new installations. This need has not previously been met by the industry.

SUMMARY

Briefly stated, the present invention provides a substrate interleaver for food products having a reduced footprint so that it can be retro-fitted into existing food preparation lines without major modification. The interleaver includes an interleaver conveyor that is positioned between a food slicer/former and a stacker. The interleaver conveyor is preferably less than about 15 inches in length. The interleaver mechanism is built with an offset housing such that it partially extends beneath one of the slicer/former or the stacker so that only a portion of the overall length of the interleaver in a direction of the food processing line contributes to the overall length of the food processing line.

In a preferred embodiment, the interleaver includes a spindle for supporting a substrate supply roll as well as guide rolls which guide the substrate from the substrate roll to a perforating roll. Acceleration rolls and guide rolls are used to separate a predetermined length of substrate from the substrate supply and feed the substrate beneath the food setup, patty or other item being delivered from the slicer/former. Guide fins or fingers are provided along the substrate feed path so that the vertically fed substrate is turned 90 degrees to be placed on interleaver conveyor as the food setup, patty or other item is delivered from the feed conveyor.

In a preferred embodiment, the now interleaved food setup, patty or other item is stacked in the stacker and placed in trays for further packaging and/or processing.

BRIEF DESCRIPTION OF THE DRAWING(S)

The foregoing summary as well as the following detailed description which will be best understood when reviewed in conjunction with the drawings, which illustrate a presenting preferred embodiment of the invention.

DETAILED DESCRIPTION OF THE PREFERRED EMBODIMENT(S)

Figure 1:
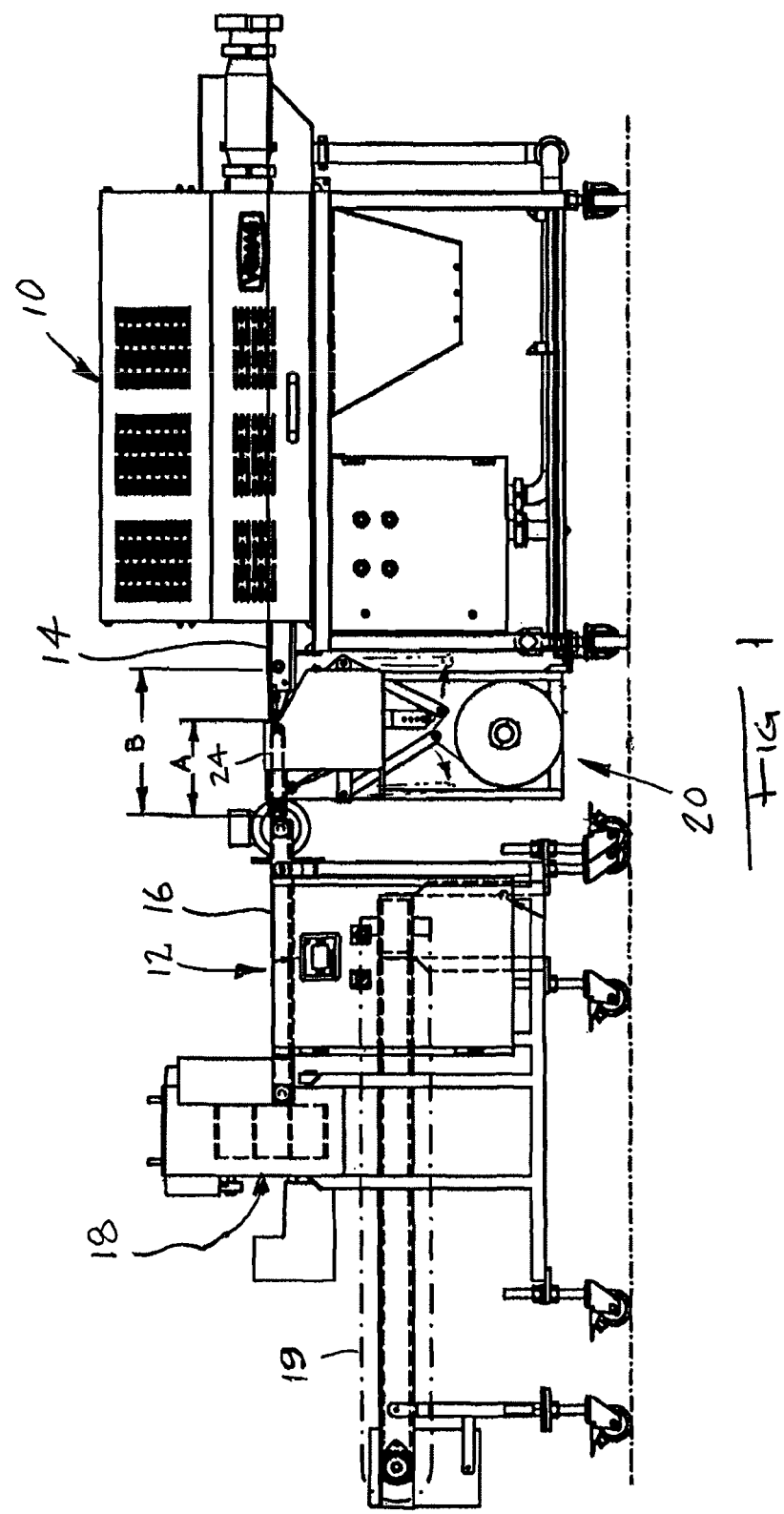
FIG. 1 is an elevational view of a food prep line in which the interleaver in accordance with the invention has been installed.

Certain terminology is used in the following description for convenience only and is not considered limiting. Words such as "up", "down", "left", and "right" are used for convenience only in describing the directions of certain features noted in the drawings, and are not considered limiting. Additionally, the words "a" and "one" are defined as including one or more of the referenced items unless specifically noted.

Figure 2:
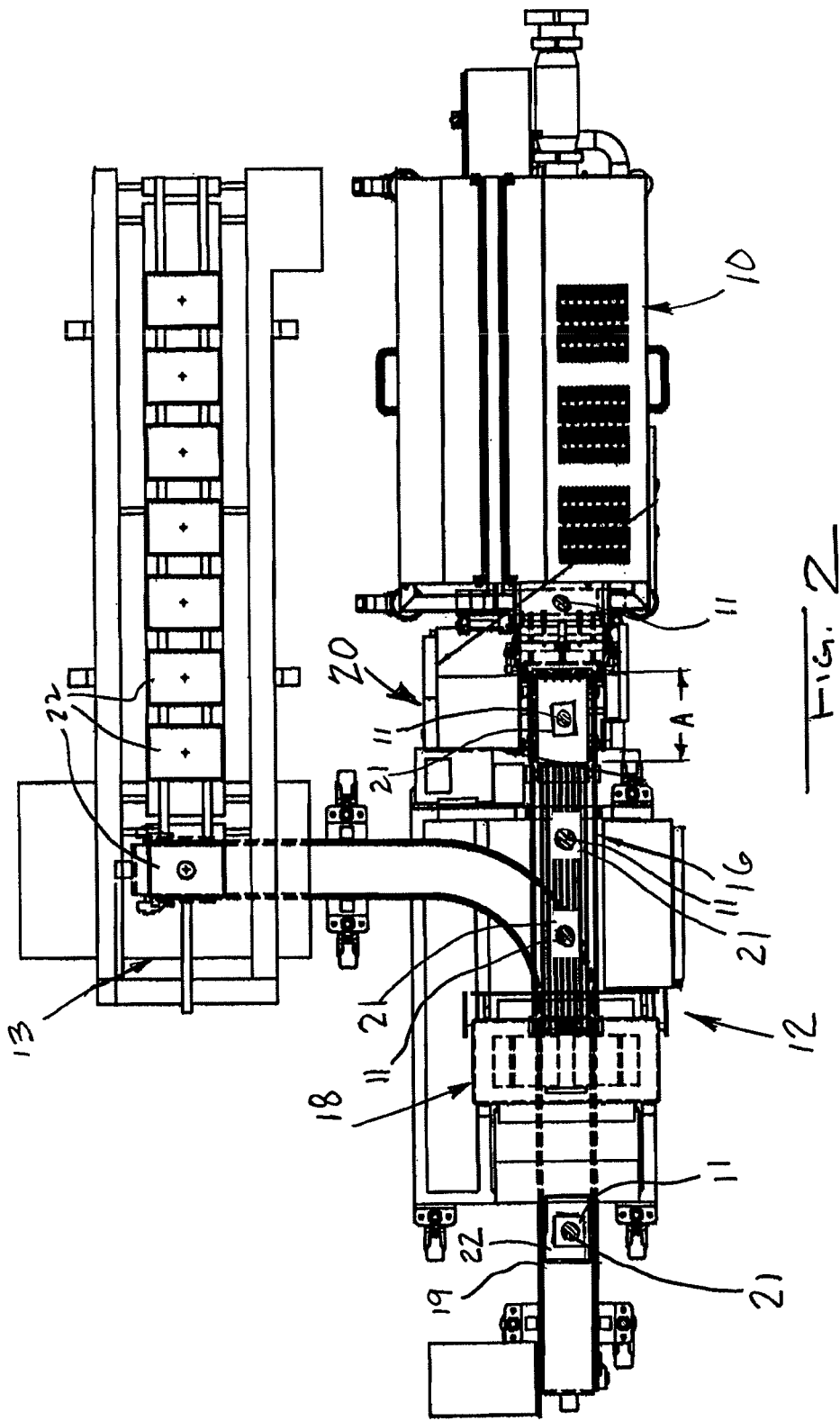
FIG. 2 is a top plan view of the food prep line shown in FIG. 1.

Referring to FIGS. 1 and 2, a food preparation line is illustrated which includes a slicer/former 10 is shown. The slicer/former can be equipment for slicing meats and creating food setups or can be a former of meat patties, such as for hamburgers, or for forming other food items. The slicer/former 10 includes a feed conveyor 14 for conveying the food items, which will be commonly referred to as a "food preparation," downstream into further packaging and handling equipment. The interleaver 20 in accordance with the invention is located immediately downstream from the feed conveyor 14, and will be described in further detail below after the general system description has been completed. The interleaver 20 inserts a substrate 21 beneath the food preparation, which can be a slice or patty 11, as it travels onto and past the interleaver 20. The interleaver 20 includes an interleaver conveyor 24, which receives the food preparation 11 and the substrate 21 nearly simultaneously, and then deposits the food preparation 11 which is now on a substrate 21 onto an in-feed conveyor 16 of a food stacker 12. The stacker 12 stacks substrate interleaved food preparations 11 prior to depositing them on a tray 22 that is fed beneath the vertical stacker assembly 18 of the stacker 12, which deposits a stack of the substrate interleaved food preparations 11 onto the tray 22 which is carried further down stream via the out-feed conveyor 19 for further packaging and/or handling. A tray feeder 13, which feeds trays 22 to the system, is also shown in FIG. 2 but not described in further detail herein. However, those skilled in the art will understand that various types of slicers/formers 10, stackers 12 and tray feeders 13 can be utilized in various food preparation lines in which the interleaver 20 in accordance with the present invention can be used.

A typical conveyor line as illustrated has an overall length of at least 10 feet and more typically 15 or more feet. When such conveyor lines do not initially include an interleaver for interleaving the substrate 21 beneath the food preparation 11, the conveyor line must be refitted with an interleaver having a very small footprint so that the longitudinal length of the processing line is not overly extended, which can result in the equipment needed to be moved to different and/or larger facilities. Additionally, for a modern manufacturing facility where it is desirable to keep the equipment footprint as small as possible for enhanced space utilization in order to keep costs at a minimum, it is further desirable to provide an interleaver having the functionality of the previously known interleavers, which are typically 4-5 feet in length, in a much smaller area.

As shown in FIG. 1, the interleaver 20 in accordance with invention has an overall length indicated at "B" which is preferably less than 2 feet in length, and more preferably less than 18 inches in length. Further, based on the configuration of the interleaver 20 in accordance with the invention, an interleaver conveyor 24 which has a length of less than 15 inches and more preferably less than 11 inches is provided. This is possible due in part to the interleaver 20 configuration in which a portion of the interleaver components are located beneath the feed conveyor 14 extending from the slicer/former 10. In a preferred embodiment of the invention, the dimension A is proximately 10⅞ inches. Thus the interleaver 20 for retro-fit applications, will generally create a 10% or less increase in the length of a processing line.

Further, as illustrated in FIG. 1, the interleaver 20 in accordance with the invention does not include separate floor supports, but rather is preferably mounted directly to an out-feed side of the slicer/former 10, eliminating the need for separate supports which could interfere with the supports for other equipment or require additional spacing.

Figure 3:
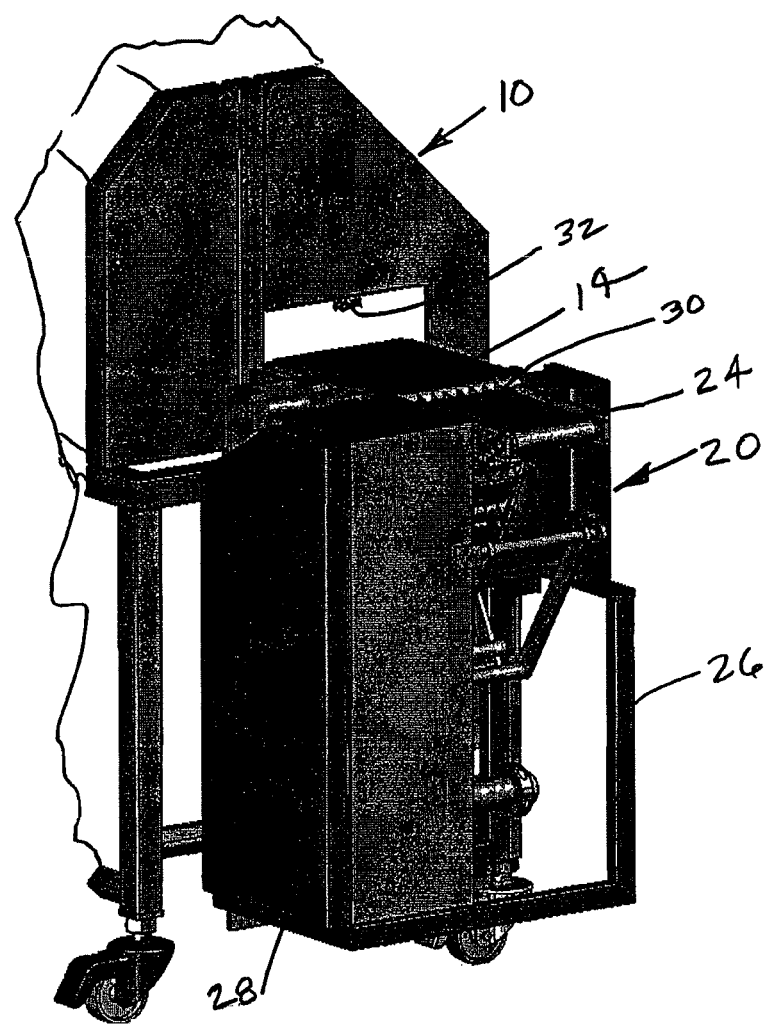
FIG. 3 is a perspective view showing the interleaver according to the invention attached to a side of the food slicer/former, which is partially shown.
Figure 4:
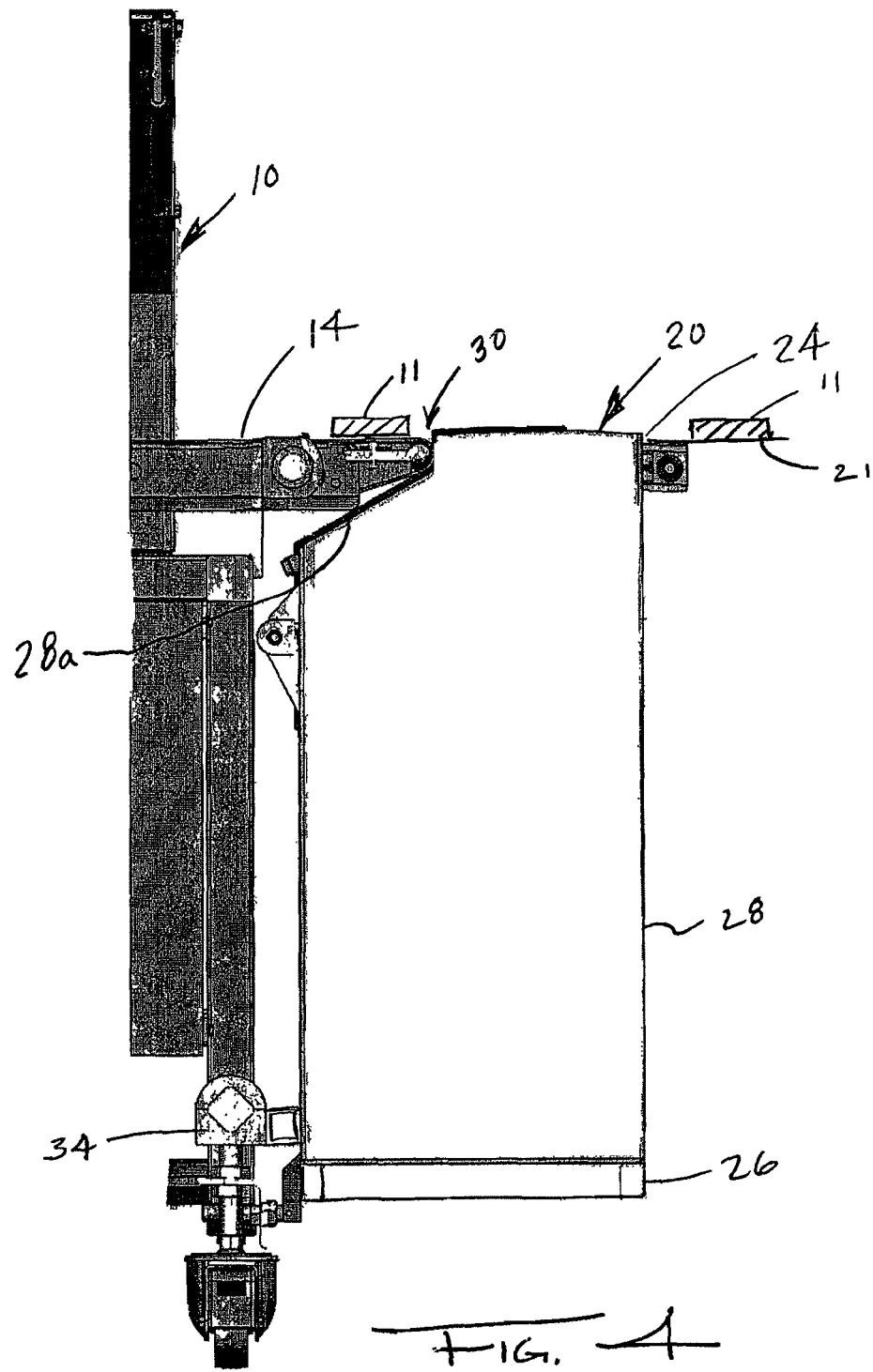
FIG. 4 is a left side elevational view of the interleaver in accordance with the invention.

Referring now to FIGS. 3-7, the interleaver 20 in accordance with the present invention will be described in further detail. Referring to FIG. 3, the interleaver 20 includes the interleaver conveyor 24 which is mounted on a frame 26. A housing 28 which houses the controller is also connected to the frame 26. As best shown in FIG. 4, the housing 28 has an angled upper portion 28A which allows a portion of the housing 28 and the frame 26 to be located under the feed conveyor 14 from the slicer/former 10. A substrate feed path 30 of the interleaver rolls out the substrate 21 between the end of the feed conveyor 14 and the interleaver conveyor 24. As shown in FIG. 4, a food preparation 11 passes from the end of the feed conveyor 14 onto the interleaver conveyor 24 and, simultaneously, a substrate 21 is fed through the feed path 30 and beneath the food preparation 11 as it passes from the feed conveyor 14 to the interleaver conveyor 24. On the right, downstream side of the interleaver 20, the prior food preparation 11 is shown on the substrate 21 which would be deposited on the downstream in-feed conveyor 16 for the stacker 12 (not shown in this Figure).

Referring again to FIG. 3, preferably a sensor 32 is mounted over the belt of the conveyor 14 detect the food preparation 11 as it travels downstream on the feed conveyor 14. The sensor 32 is preferably a photo-eye sensor and signals the controller located within the controller housing 28 to initiate a substrate feed sequence which, based on a belt speed of the feed conveyor 14, the controller initiates at the proper time so that the substrate 21 is fed from the feed path 30 under the food preparation 11 as it transitions between the feed conveyor 14 and the interleaver conveyor 24.

Figure 5:
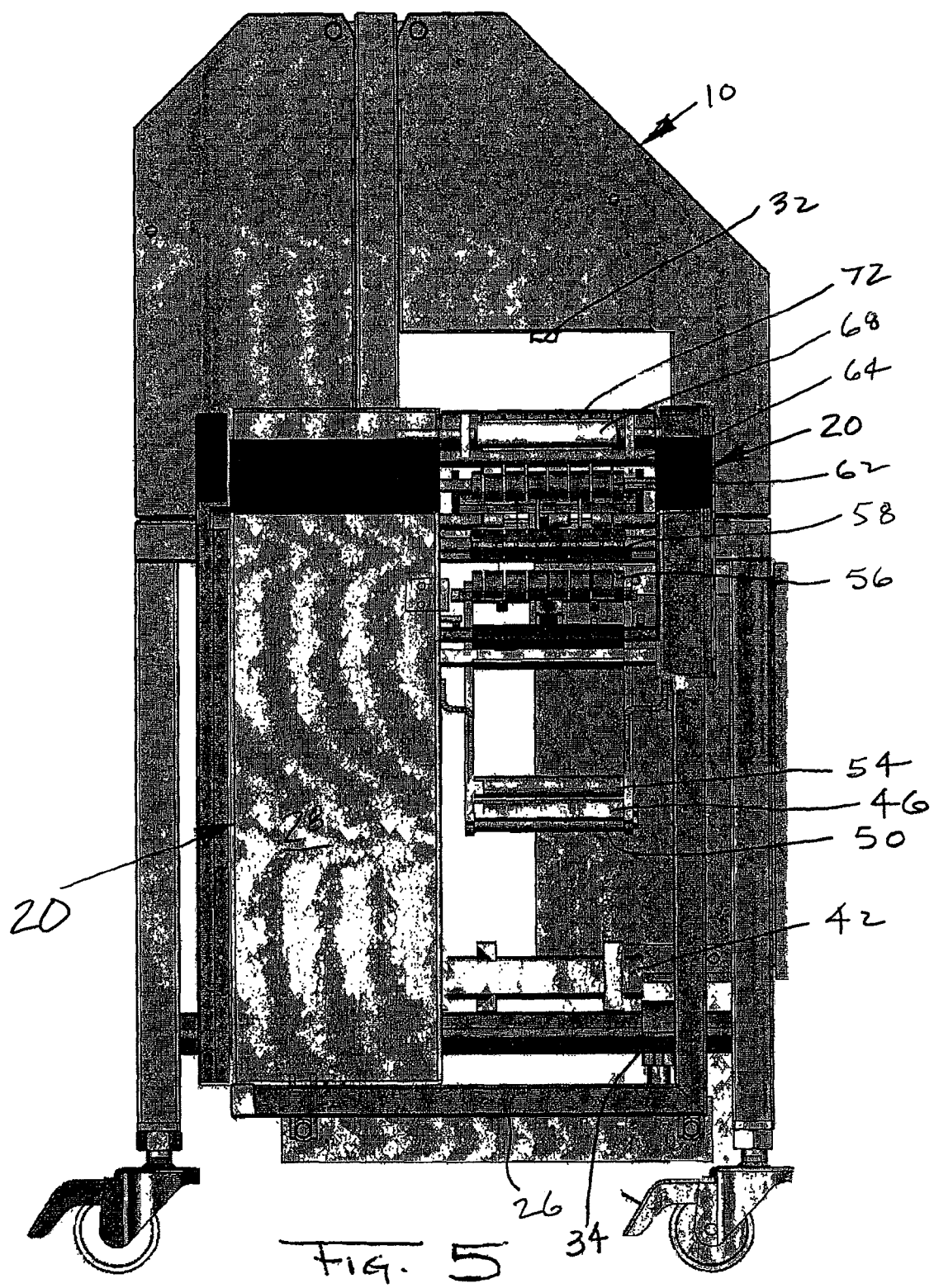
FIG. 5 is a front view of the interleaver with the cover removed showing the roller and perforator assembly in the interleaver of FIG. 4.
Figure 6:
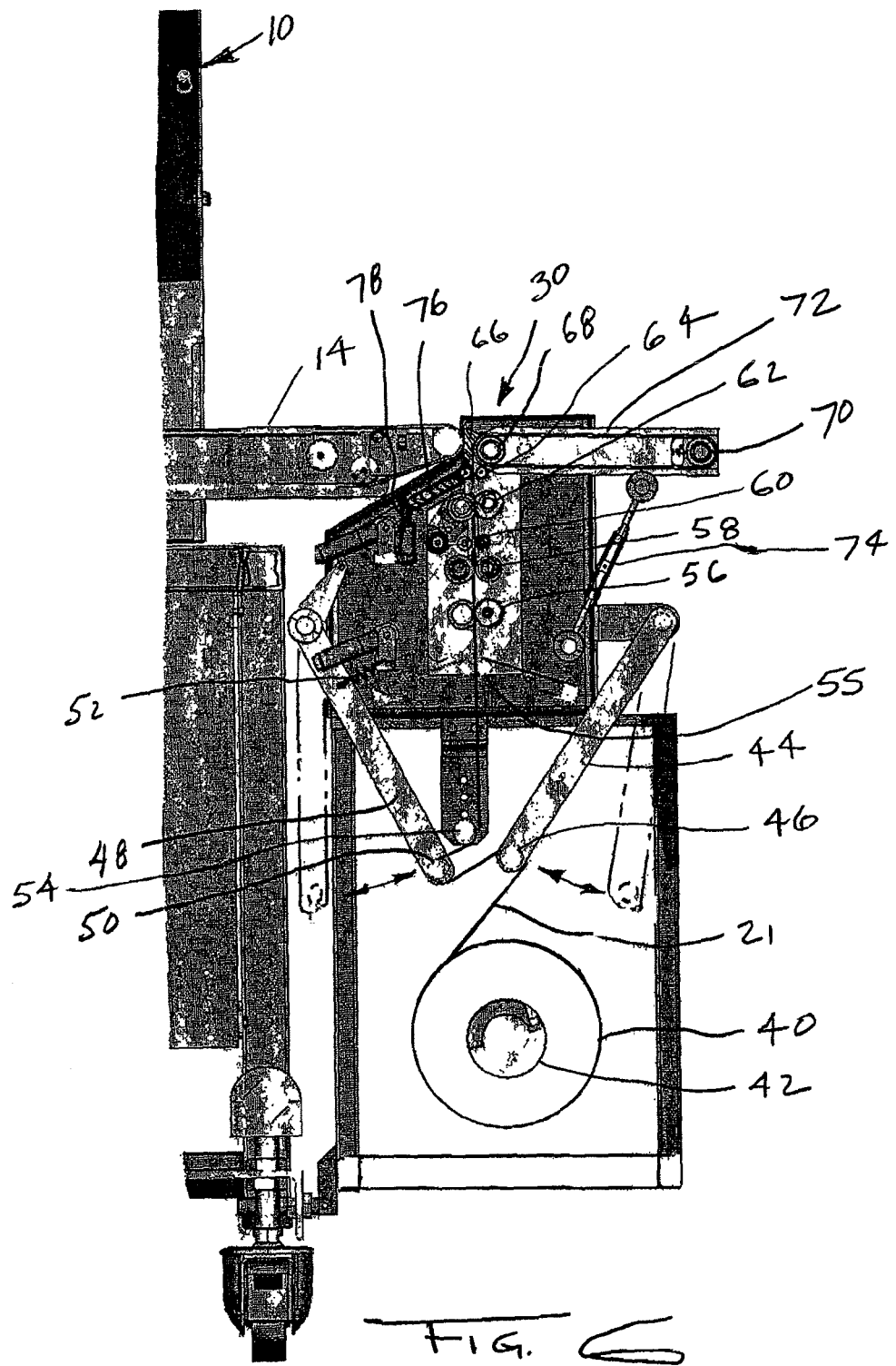
FIG. 6 is a cross-sectional view through the interleaver shown in FIG. 4 in which the rollers are shown within the interleaver housing.

Referring to FIGS. 5 and 6, the internal components of the interleaver 20 are shown. Within the frame 26, a spindle 42 is provided for placement of the roll of substrate 40. The continuous substrate from the roll 40 is fed over and around rollers 46, 50 of dancer bars 44, 48 as shown in FIG. 6. The first dancer bar 44 is gravity biased so that it will drop toward a gravity-based neutral position, shown in phantom lines in FIG. 6, which helps to pull the substrate 21 from the substrate roll 40. The second dancer bar 48 is spring loaded via a spring 52 towards an opposite generally vertical position, as also indicating in phantom lines in FIG. 6. Through the actions of the spring loaded second dancer bar 48 and the gravity weighted first dancer bar 44, substrate is pulled from the substrate roll 40 without the need for a feed motor and slack is available for powered feed of the substrate by the interleaver 20 through the feed path 30 and beneath the food preparation 11, as required.

As shown, a fixed roll 54 is provided to guide the substrate to the substrate feed path, and the substrate is guided upwardly between a pair of guide bars or rollers 55 into the nip located between a pair of feed rollers 56. Preferably one or both of the feed rollers are a rubber or synthetic rubber material and can grip the substrate 21 via pressure force. One of the rollers 56 could also be made of a hard plastic or metallic material. Perforation rollers 58 are located upstream along the substrate feed path 30 from the feed rollers 56. The perforation rollers 58 comprise at least one perforating knife which creates a horizontal perforation line along the continuous sheet of substrate 21 fed from the substrate roll 40. Guide bars or rollers 60 then guide the perforated, but still connected, continuous sheet to acceleration rollers 62 which, based on the speed of the feed conveyor 14 and the presence of a food preparation 11 detected by the sensor 32, are driven or accelerated via the controller with sufficient speed and/or force such that the perforations are broken and a single piece of substrate 21 is accelerated upwardly and between guide bars or rollers 64 onto the interleaver conveyor 24 as the food preparation 11 is delivered from the feed conveyor 14 onto the interleaver conveyor 24. Alternatively, instead of accelerating the rollers 62, the controller can slow or stop the rotation of the feed rollers 56, which also has the desired result of separating the substrate 21 from the continuous roll at the perforations. The acceleration rollers 62 include at least one rubber or synthetic rubber which presses against the opposing roller to engage the substrate with sufficient force so that when the rollers 62 are accelerated, the substrate 21 is pulled upwardly with sufficient force to break the perforations.

Figure 7:
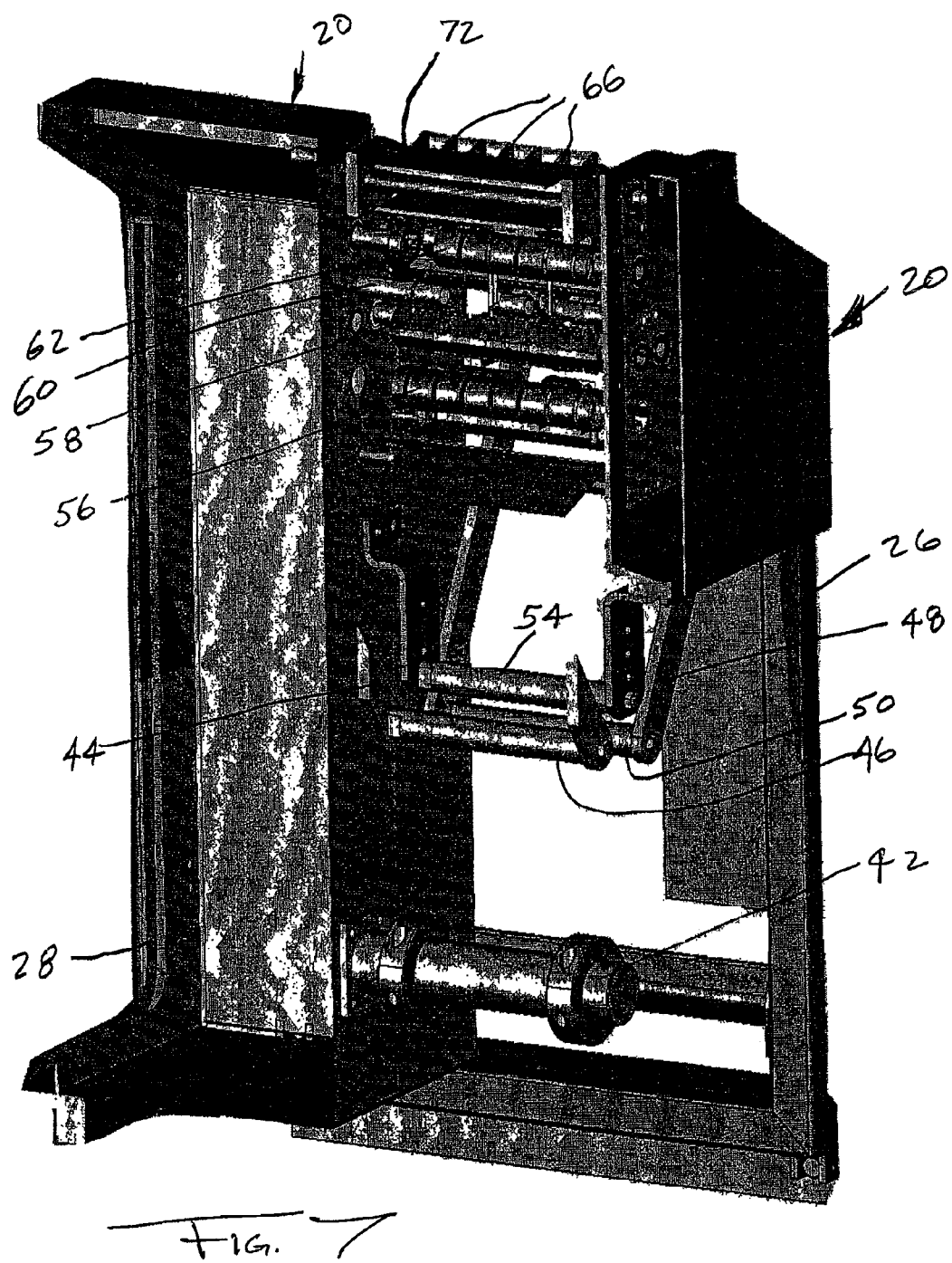
FIG. 7 is a perspective view, partially in cross-section, showing the feed rollers of the interleaver of FIG. 4.

Guide fins or 66, best shown in FIGS. 6 and 7, insure that the piece of substrate 21 being fed beneath the food preparation 11 wraps partially around the upstream conveyor belt 72 of the interleaver conveyor 24. This insures that the substrate 21 is moving in the correct direction with the correct orientation as the food preparation 11 transfers from the feed conveyor 14 onto the substrate and the interleaver conveyor 24. The guide fins or fingers 66 are preferably connected to a pivotably mounted tray 76 that catches scraps or pieces of the food preparation 11 as it is transferred onto the interleaver conveyor 24. The tray 76 is connected to a jack screw 78 or other adjustment mechanism opposite from the pivot end, which is in proximity to the rolls 64, so that tilting the tray upwardly with the jack screw 78 causes the fins or fingers 66 to press against the conveyor belt 72 of the interleaver conveyor 24. This has the advantage that the substrate 21 being inserted is pressed against the conveyor belt 24 and carried forward by it as soon as the insertion is triggered by the controller, allowing substrates of reduced length to be used as the placement position under the food preparation 11 is more precise. This reduces the amount of substrate material required, allowing further cost savings. The fins or fingers 66 are preferably made of a flexible polymeric material.

The down stream roller 70 for the interleaver conveyor 24 is also shown. The interleaver conveyor 24 is preferably a belt conveyor with the belt 72 wrapping around the conveyor rollers 68 and 70. Alternatively, the conveyor 24 can be formed by a plurality of bands which are spaced apart in the cross direction to a direction of conveyor travel. The interleaver conveyor 24 is preferably positionable via an adjustable support 74 so that the correct transfer height or level from the interleaver conveyor to the in feed conveyor 16 for the stacker 12 is provided.

Preferably the substrate is any suitable food grade material, such as paper or polyethylene on which it is permitted to place food for storage and/or stacking. The length of the substrate 21 is preferably adjustable. The controller is preferably a PLC or computer based controller depending upon the size of the food preparation being interleaved. While a single photo-eye sensor 32 is shown, those skilled in the art will recognize that the position of the photo-eye sensor 32 can be at any desired location on the feed conveyor 14 such that a signal is set to the interleaver controller. Additionally, the controller can also receive speed data from a sensor (not shown) connected to the in-feed conveyor.

Those skilled in the art will recognize that various types of food slicers or formers may be utilized as the slicer/former 10, with one preferred version being a Vemag Model FM 250 flattener. Additionally, the stacker 12 can be any type of stacker although a Verastax stacker is one preferred stacker which can be utilized.

The perforated rollers 58 are preferably sized to create a single line of perforations for a desired predetermined length of substrate, which is dependent upon a knife timing of at least one of the perforated rollers having a radically extending knife located thereon which interacts with the opposing roller in order to form the line of perforations.

While the feed rollers 56, perforating rollers 58 and acceleration rollers 62 have been described, the drive system for these rollers preferably includes one or more motors which are driven in controlled time based upon the required substrate feeds. These motors are controlled via the interleaver controller so that proper movement of the substrate 21 is provided in timed movement to the food preparations 11 being delivered by the feed conveyor 14. In a preferred embodiment, the guide rollers 62 located beneath the interleaver conveyor 24 are driven by the same drive system as the interleaver conveyor 24, and thus constantly move in time with the interleaver conveyor 24.

Preferably, the spindle 42 for the roll of substrate 40 is undersized in comparison to the inner diameter opening of the roller substrate 40. This provides for less friction and allows the interleaver 20 to operate without the requirement for a separate motor drive for the substrate roll.

As shown throughout the drawings, the interleaver 20 is supported directly on the slicer/former 10 and does not require separate supports on the floor. Based on the configuration of the interleaver and the location of a number of components beneath the feed conveyor 14 from the slicer/former, as shown, or possibly also by locating components beneath the in-feed conveyor 16 of the stacker, the overall footprint of the interleaver 20 is reduced in comparison to the known prior art thereby allowing for positioning and use without affecting a gross change in the overall length of the food production line.

The invention claimed is:

1. A food processing system comprising:
 a slicer/former for food preparations having a feed conveyor;
 a stacker for stacking food preparations;
 an interleaver for inserting a substrate under a food preparation from the food slicer/former as it transitions to the stacker, the interleaver being arranged such that a portion of the interleaver is located beneath the feed conveyor of the slicer/former,
 the interleaver including an interleaver conveyor which extends from the feed conveyor to the stacker in-feed conveyor,
 a roll of substrate from which a continuous sheet of substrate is fed,
 a plurality of fins or fingers located at a substrate insertion position press the substrate being inserted against the interleaver conveyor as it is inserted,
 a perforation roller to perforate the continuous sheet of substrate to a desired predetermined length and acceleration rolls to feed and separate a substrate piece to be interleaved at a desired insertion time and insert the substrate under the fins or fingers onto the interleaver conveyor beneath the food preparation, a cutting portion of the perforation roller is set to cut the substrate piece and the fins or fingers press the substrate piece immediately against the interleaver conveyor to reduce slippage of the substrate and provide more precise positioning, and
 an overall length of the interleaver conveyor being less than a length of the interleaver.

2. The food processing system of claim 1, wherein the interleaver conveyor is less than about 15 inches in length.

3. A food processing system comprising:
 a slicer/former for food preparations having a feed conveyor;
 a stacker for stacking food preparations;
 an interleaver for inserting a substrate under a food preparation from the food slicer/former as it transitions to the stacker, the interleaver being arranged such that a portion of the interleaver is located beneath the feed conveyor of the slicer/former,
 a plurality of fins or fingers located at a substrate insertion position that press the substrate being inserted against the interleaver conveyor as it is inserted, and
 the fins or fingers are connected to a catch tray for receiving pieces of material falling through the conveyor.

4. The food processing system of claim 3, wherein the tray is pivotably mounted and biased upwardly at a position away from a pivot point to press the fins or fingers toward the interleaver conveyor.

5. The food processing system of claim 1, wherein the overall length of the interleaver conveyor is less than about 75% of an overall length of the interleaver in a feed direction.

6. The food processing system of claim 1, wherein the interleaver is cantilevered from the slicer/former.

7. The food processing system of claim 1, further comprising a controller, a sensor located over the slicer/former feed conveyor which signals the controller when the food preparation to be interleaved is located at a predetermined location, and the controller is connected to the interleaver to signal the interleaver to insert the substrate at a predetermined time underneath the food preparation as it transfers from the feed conveyor to the interleaver conveyor.

8. The food processing system of claim 1, the interleaver further comprises at least one dancer bar for assisting in pulling the continuous sheet of substrate from the roll, and feed rollers which define a substrate path.

9. The food processing system of claim 1, wherein the fins or fingers are made of a polymeric material.

10. The food processing system in accordance with claim 1, wherein the interleaver is adapted to be retro-fit onto an existing food processing system.

\* \* \* \* \*